United States Patent Office 2,794,803
Patented June 4, 1957

2,794,803
SUBSTITUTED PYRIDINES AND THEIR PREPARATION

William Joseph Middleton, Claymont, Del., assignor to E. I. du Pont de Nemours and Company, Wilmington, Del., a corporation of Delaware No Drawing. Application April 15, 1955,
Serial No. 501,715

13 Claims. (Cl. 260—247.5)

This invention is concerned with a new class of highly substituted pyridines and their preparation, and is more particularly concerned with 2,6-diamino-3,5dicyanopyridines which are further substituted in the 4-position, and with a process for their preparation.

It is an object of this invention to provide a new class of highly substituted pyridines. Another object is to provide an efficient process for preparing these new pyridine compounds. Other objects will become apparent from the following specification and claims.

There has now been discovered the process of reacting 2 - amino - 3,5 - dicyano - 6 - halogenopyridines, particularly those having substituents in the 4-position, with ammonia or primary, secondary or tertiary amines, including heterocyclic amines, to yield a new class of compounds, the 2,6-diamino-3,5-dicyanopyridines, where the substituent in the 6-position may be a primary, secondary, tertiary or quaternary amine group, which may be a heterocyclic amine group.

The 2,6-diamino-3,5-dicyanopyridines are all at least slightly soluble in water, and their aqueous solutions are unexpectedly neutral in spite of the presence of at least three basic functions in the two amino groups and the pyridine nitrogen.

Of particular interest among the products of this invention are the fully ring-substituted pyridines, i. e., the 2,6-diamino-3,5-dicyanopyridines having the 4-position occupied by a nucleophilic or electrophilic substituent. These products are formed by reaction of ammonia or amines with the corresponding 4-substituted-2-amino-3,5-dicyano-6-halogenopyridines.

The process and products of this invention may be illustrated by the following equations, wherein X is halogen, R is hydrogen or a nucleophilic or electrophilic substituent, particularly cyano, dicyanomethyl, amino, halogeno, hydroxyl, alkyl, aryl, alkoxy, aryloxy, alkylthio, arylthio, alkylsulfinyl, arylsulfinyl, alkylsulfonyl, and arylsulfonyl radicals, and $R_1$ and $R_2$ and $R_3$ represent members of the group consisting of hydrogen, alkyl, alicyclic hydrocarbon, aralkyl and aryl monovalent radicals and, when $R_1$ and $R_2$ are taken together and form with the nitrogen a heterocyclic amine, a divalent aliphatic radical and, when $R_1$, $R_2$ and $R_3$ are taken together and form with the nitrogen a heterocyclic amine, a trivalent aliphatic radical:

(1) Reaction with ammonia or a primary or secondary amine:

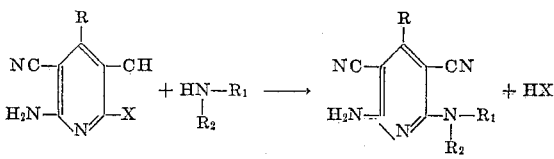

(2) Reaction with a tertiary amine:

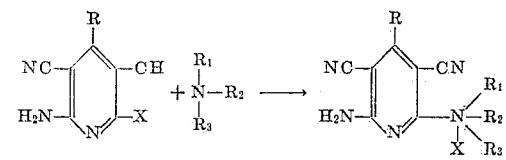

(3) Reaction with a heterocyclic amine:

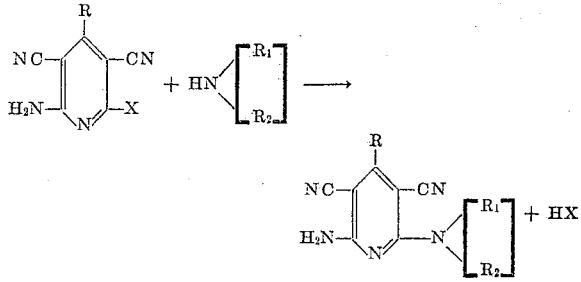

The products of this invention can, therefore, be represented by the general formula,

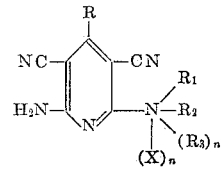

wherein X, R, $R_1$, $R_2$ and $R_3$ are as defined above and $n$ is 0 or 1 and is 0 when a substituent represented by $R_1$ or $R_2$ is hydrogen.

In the preferred process of this invention, ammonia or an amine is added to a solution of one of the above 2 - amino - 6 - halogeno - 3,5 - dicyanopyridines in an inert solvent and the mixture is heated at reflux temperature for a few minutes. The resulting solution is cooled and mixed with two volumes of water. This causes the 2,6-diamino-3,5-dicyanopyridine, which is formed, to precipitate. It is collected by filtration and purified by recrystallization from alcohol. Methods for preparing 2 - amino - 6 - halogeno - 3,5 - dicyanopyridines for use in the process will be described following the examples.

The reaction with ammonia or an amine to form a 2,6-diamino-3,5-dicyanopyridine can be carried out at ordinary temperatures, i. e., 20–25° C., without external heating. However, the process is mildly exothermic and elevated reaction temperatures are therefore sometimes encountered spontaneously. On the other hand, it is sometimes preferable to operate at temperatures in the neighborhood of 0° C. to avoid uncontrolled reaction rates.

The use of an inert solvent medium for carrying out the process of this invention is preferred, but it is not essential. For example, the reaction of Example I can be carried out by carefully adding 2-amino-6-chloro-3,4,5-tricyanopyridine to liquid ammonia and stirring the mixture until formation of 2,6-diamino-3,4,5-tricyanopyridine is complete.

When an inert solvent medium is used, it is preferred to employ those liquids which are good solvents for the highly substituted pyridines involved. For example, such solvents as the alcohols, i. e., methanol, ethanol, butonol, ethylene glycol, glycerine and the like, ketones such as acetone, methyl ethyl ketone and the like, and mixtures of these solvents with water may be employed. Pressure is not a critical factor in carrying out this reaction.

In the following examples, which illustrate preferred embodiments of the invention, parts are by weight:

EXAMPLE I

A solution of 50 parts of 2-amino-6-chloro-3,4,5-tricyanopyridine in 198 parts of acetone is saturated with anhydrous ammonia. A yellow precipitate forms. Water (500 parts) is added, the mixture is cooled, and the yellow precipitate (43 parts) is collected on a filter, washed with water, and recrystallized after treatment with activated carbon in a dimethylformamide/water mixture to give 30 parts of 2,6-diamino-3,4,5-tricyanopyridine in the form of yellow needles which sublime above 250° C. A sample of this material is sublimed for analysis.

*Analysis.*—Calcd. for $C_8H_4N_6$: C, 52.17; H, 2.19; N, 45.64. Found: C, 52.44; H, 2.32; N, 45.46, 45.69.

When equivalent amounts of each of the 2-amino-6-chloro-3,5-dicyanopyridine starting materials indicated in Table I are substituted for the 2-amino-6-chloro-3,4,5-tricyanopyridine of Example I, there are obtained 2,6-diamino-3,5-dicyanopyridines having the indicated substituents in the 4-position.

*Table I.—4-Substituted-2,6-diamino-3,5-dicyanopyridines*

| Starting Material (2-amino-3,5-dicyanopyridine) | | Product |
|---|---|---|
| Substituent in 4-position | Substituent in 6-position | Substituent in 4-position of 2,6-diamino-3,5-dicyano-pyridine |
| methyl | chloro | methyl |
| methylmercapto | chloro | methylmercapto |
| methylsulfinyl | chloro | methylsulfinyl |
| methylsulfonyl | chloro | methylsulfonyl |
| dicyanomethyl | chloro | dicyanomethyl |
| hydroxy | chloro | hydroxy |
| phenoxy | chloro | phenoxy |
| phenylthio | chloro | phenylthio |
| phenylsulfinyl | chloro | phenylsulfinyl |
| phenylsulfonyl | chloro | phenylsulfonyl |
| ethoxy | chloro | ethoxy |
| amino | chloro | amino |
| methylamino | chloro | methylamino |
| piperidino | chloro | piperidino |
| phenyl | chloro | phenyl |
| p-dimethylaminophenyl | chloro | p-dimethylaminophenyl |

In a similar way, when an ethanol solution of 2-amino-6-bromo-4-chloro-3,5-dicyanopyridine is carefully treated with a single equivalent of ammonia, 4-chloro-2,6-diamino-3,5-dicyanopyridine is obtained.

EXAMPLE II

A solution of 100 parts of 2-amino-6-chloro-3,4,5-tricyanopyridine in 396 parts of acetone is mixed with about 950 parts of 25% aqueous methylamine solution. A yellow precipitate forms immediately. The mixture is diluted with 2000 parts of water, cooled, and the precipitate is collected on a filter, washed with water, and recrystallized from a dimethylformamide-water mixture. There is obtained 85 parts of 2-amino-6-methylamino-3,4,5-tricyanopyridine in the form of light yellow needles, which sublime when heated above 250° C.

*Analysis.*—Calcd. for $C_9H_6N_6$: C, 54.54; H, 3.05; N, 42.41. Found: C, 54.33; H, 3.05; N, 42.39, 41.99.

EXAMPLE III

A solution of 100 parts of 2-amino-6-chloro-3,4,5-tricyanopyridine in 396 parts of acetone is mixed with 431 parts of piperidine. A very exothermic reaction ensues, and a yellow precipitate forms. Cold water (2000 parts) is added to the reaction mixture, and the solid which precipitates is collected on a filter, washed with water and recrystallized from alcohol. There is obtained 85 parts of 2-amino-6-piperidino-3,4,5-tricyanopyridine in the form of yellow crystals, M. P. 218° C.

*Analysis.*—Calcd. for $C_{13}H_{12}N_6$: C, 61.89; H, 4.91; N, 33.32. Found: C, 61.90; H, 4.74; N, 33.35, 33.21.

When morpholine is substituted for piperidine in Example III, 2-amino-6-morpholino-3,4,5-tricyanopyridine is obtained.

EXAMPLE IV

Piperidine (172 parts) is added to a solution of 200 parts of 2-amino-6-bromo-3,4,5-tricyanopyridine in 1980 parts of acetone. The yellow precipitate which forms is collected on a filter, washed with water and recrystallized from alcohol. There is obtained 140 parts of 2-amino-6-piperidino-3,4,5-tricyanopyridine in the form of yellow needles, M. P. 218–219° C. The infrared spectrum of this compound is identical with that of the compound prepared from 2-amino-6-chloro-3,4,5-tricyanopyridine and piperidine (Example III).

EXAMPLE V

Aniline (31 parts) is added to a solution of 20 parts of 2-amino-6-bromo-3,4,5-tricyanopyridine in 197 parts of ethyl alcohol. The resulting solution is heated under reflux for 5 minutes, and then cooled and mixed with 500 parts of water. The yellow precipitate which forms is collected on a filter, washed with water, and recrystallized from ethyl alcohol. There is obtained 15 parts of 2-amino-6-anilino-3,4,5-tricyanopyridine in the form of yellow needles, M. P. 275° C.

*Analysis.*—Calcd. for $C_{14}H_8N_6$: C, 64.62; H, 3.10; N, 32.30. Found: C, 64.92; H, 3.30; N, 32.28, 32.18.

When an equivalent amount of α-naphthylamine is substituted for aniline in Example V, 2-amino-6-(α-naphthylamino)-3,4,5-tricyanopyridine is obtained. By a similar substitution of m-nitroaniline, 2-amino-6-(m-nitroanilino)-3,4,5-tricyanopyridine is obtained.

EXAMPLE VI

A solution of 124 parts of 2-amino-6-bromo-3,4,5-tricyanopyridine and 68 parts of p-chloroaniline in 396 parts of acetone is allowed to stand at room temperature for 16 hours. A yellow precipitate forms. Water (1000 parts) is added, and the solid is collected on a filter, washed with water, and recrystallized from a dimethylformamide-water mixture. There is obtained 130 parts of 2-amino-6-p-chloroanilino-3,4,5-tricyanopyridine in the form of yellow crystals, M. P. 315–316° C.

*Analysis.*—Calcd. for $C_{14}H_7N_6Cl$: C, 57.05; H, 2.39; N, 28.52; Cl, 12.03. Found: C, 57.23, 56.94; H, 2.34, 2.26; N, 28.54, 28.74; Cl, 12.11.

When N-methylaniline is substituted for p-chloroaniline in the process of Example VI, 2-amino-6-(N-methylanilino)-3,4,5-tricyanopyridine is obtained.

EXAMPLE VII

To a solution of 1018 parts of 2-amino-6-chloro-3,4,5-tricyanopyridine in 3960 parts of acetone is added 980 parts of dimethyldodecyl amine

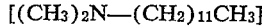

$$[(CH_3)_2N-(CH_2)_{11}CH_3]$$

A yellow precipitate forms. The reaction mixture is mixed with 3567 parts of ethyl ether, and the solid is collected on a filter and washed with ether. There is obtained 1850 parts (92% yield) of 2-(6-amino-3,4,5-tricyanopyridyl)dimethyldodecylammonium chloride in the form of a yellow powder.

*Analysis.*—Calcd. for $C_{22}H_{33}N_6Cl$: C, 63.36; H, 7.98; N, 20.16; Cl, 8.50. Found: C, 63.65; H, 8.10; N, 20.32; Cl, 8.82.

When N,N-dimethylaniline is substituted for dimethyldodecyl amine in the process of Example VII, 2-(6-amino-3,4,5-tricyanopyridyl)-N,N-dimethylanilinium chloride is obtained.

EXAMPLE VIII

A solution of 1018 parts of 2-amino-6-chloro-3,4,5- tricyanopyridine in 3960 parts of acetone is mixed with 650 parts of quinoline. A yellow crystalline precipitate forms (1600 parts, 96% crude yield). This precipitate is recrystallized from alcohol-water. N-(2-[6-amino-3,4,5-tricyanopyridyl]) quinolinium chloride is obtained as yellow needles, M. P. 189–192° C.

Analysis.—Calcd. for $C_{17}H_9N_6Cl$: C, 61.36; H, 2.73; N, 25.26; Cl, 10.66. Found: C, 61.55; H, 2.65; N, 25.30, 25.42; Cl, 10.63, 10.68.

When an equivalent amount of thiazole is substituted for quinoline in Example VIII, N-(2-[6-amino-3,4,5-tricyanopyridyl]) thiazolium chloride is obtained.

When an equivalent amount of pyridine is substituted for quinoline in Example VIII, N-(2-[6-amino-3,4,5-tricyanopyridyl])pyridinium chloride is obtained. By a similar substitution of pyrrole, 2-amino-6-(N-pyrrolyl)-3,4,5-tricyanopyridine is obtained.

EXAMPLE IX

A solution of 50 parts of 2-amino-6-iodo-3,4,5- tricyanopyridine in 396 parts of hot acetone is mixed with 86 parts of piperidine. The solution is cooled and then poured into 2000 parts of cold water. The yellow precipitate which forms is collected on a filter, washed with water, and recrystallized from alcohol. There is obtained 11 parts of 2-amino-6-piperidino-3,4,5-tricyanopyridine in the form of yellow needles, M. P. 218° C. The infrared spectrum of this compound is identical with that of the product from Example III.

EXAMPLE X

Concentrated aqueous ammonia (135 parts) is added to a solution of 2 parts of 2-amino-6-chloro-3,5-dicyanopyridine in 268 parts of acetone and the clear solution is allowed to stand overnight. A white crystalline solid slowly forms. This product is washed with water and sublimed at 200° C. to yield 1 part of 2,6-diamino-3,5-dicyanopyridine in the form of a white solid which does not melt below 300° C.

Analysis.—Calcd. for $C_7H_5N_5$: C, 52.85; H, 3.15; N, 44.0. Found: C, 52.79, 52.63; H, 3.09, 3.16; N, 41.84, 42.26.

The 2-amino-6-halogeno-3,5-dicyanopyridines used in the process of this invention are prepared as follows:

2-AMINO-6-CHLORO-3,4,5-TRICYANOPYRIDINE

Synthesis of this compound proceeds by the following steps:

(1) Tetracyanoethylene is prepared from malononitrile and sulfur monochloride. To a refluxing solution of 33 parts of malononitrile in 600 parts of chloroform, 70 parts of sulfur monochloride is added slowly over a period of six hours. The mixture is refluxed for 20 hours, and the chloroform is boiled off by heating on a steam bath. During the latter stages of this evaporation there is evidence of an exothermic reaction, and some crystalline material is deposited on the walls of the container. This deposit is combined with the residue from the evaporation and extracted exhaustively with diethyl ether in a Soxhlet extractor. The ether extract is evaporated to obtain 18 parts of crude tetracyanoethylene, which is purified by sublimation at 100° C. under reduced pressure (1–2 mm.).

(2) A solution of pyridinium pentacyanopropenide [$(NC)_2C=C(CN)—C(CN)_2 \cdot C_5H_6N$] is then prepared by adding a solution of 393 parts of pyridine in 600 parts of water to a solution of 640 parts of tetracyanoethylene in 1980 parts of acetone (cooled to —25° C.). The mixture is allowed to warm slowly to room temperature. It is not necessary to isolate the pyridinium pentacyanopropenide which is formed in this solution. The mixture is saturated with hydrogen chloride by passing in the anhydrous gas. The mixture is then cooled to 0° C., and 5000 parts of cold water is added. The light yellow precipitate which forms is collected on a filter, washed with water and dried. The product is recrystallized from a mixture of alcohol and water to yield 450 parts of 2-amino-6-chloro-3,4,5-tricyanopyridine in the form of pale yellow needles melting at 228–229° C.

In the final step of the above synthesis, if hydrogen bromide or hydrogen iodide is substituted for hydrogen chloride, the reaction product is 2-amino-6-bromo-3,4,5-tricyanopyridine or 2-amino-6-iodo-3,4,5-tricyanopyridine, respectively.

2-AMINO-6-CHLORO-3,5-DICYANOPYRIDINE

Ninety-one parts of the hydrated sodium salt of 1,1,3,3-tetracyanopropene $(Na[(NC)_2C=CH—C(CN)_2] \cdot H_2O$, Y. Urushibara, Bull. Chem. Soc. Japan 2, 278 (1927)) is dissolved in 3960 parts of acetone. The solution is saturated with hydrogen chloride by passing in an excess of the gas during a period of 20 minutes. A precipitate of 29 parts of sodium chloride forms and is removed by filtration. The filtrate is allowed to stand at room temperature for two days, during which time 85 parts of 2-amino-6-chloro-3,5-dicyanopyridine slowly precipitates. It is separated by filtration. The white crystalline solid sublimes without melting at 200° C.

2-AMINO-6-CHLORO-3,5-DICYANO-4-METHYLPYRIDINE

When the sodium salt of 2-methyl-1,1,3,3-tetracyanopropene (Urushibara and Takebayashi, Bull. Chem. Soc. Japan, 11, 557–575) is substituted for the sodium salt of 1,1,3,3-tetracyanopropene in the above synthesis, 2-amino-6-chloro-3,5-dicyano-4-methylpyridine is obtained.

2-AMINO-3,5-DICYANO-6-FLUORO-4-METHYLPYRIDINE

When 2-amino-6-chloro-3,5-dicyano-4-methylpyridine is treated with potassium fluoride or silver fluoride by the method shown by Wagner and Zook, "Synthetic Organic Chemistry," Wiley, 1953, page 94, 2-amino-3,5-dicyano-6-fluoro-4-methylpyridine is obtained.

2 - AMINO - 6 - CHLORO - 3,5 - DICYANO - 4 - METHYL - MERCAPTOPYRIDINE, ETC.

When dicyanoketene dimethyl thioacetal

$(C(CN)_2=C(SCH_3)_2$

Edwards and Kendall, U. S. 2,533,233) reacts with a single molecular equivalent of sodiomalononitrile in ethanol solution at room temperature, there is obtained the sodium salt of 2-methylmercapto-1,1,3,3-tetracyanopropene (sodium salt of $\alpha,\gamma$-dicyano-$\beta$-methylmercaptoglutaconodinitrile). This compound is treated with anhydrous hydrogen chloride, and there is obtained 2-amino-6-chloro-3,5-dicyano-4-methylmercaptopyridine. By careful oxidation of the sodium salt of 2-methylmercapto-1,1,3,3-tetracyanopropene with a single molecular equivalent of potassium permanganate or acidic hydrogen peroxide, there is obtained 2-methylsulfinyl-1,1,3,3-tetracyanopropene which when treated with anhydrous hydrogen chloride yields 2-amino-6-chloro-3,5-dicyano-4-methylsulfinylpyridine. Further oxidation of 2-methylsulfinyl-1,1,3,3-tetracyanopropene with permanganate yields 2-methylsulfonyl-1,1,3,3-tetracyanopropene which on treatment with anhydrous hydrogen chloride yields 2-amino-6-chloro-3,5-dicyano-4-methylsulfonylpyridine.

2 - AMINO - 6 - CHLORO - 3,5 - DICYANO - 4 - DICYANO - METHYLPYRIDINE

When dicyanoketene dimethyl thioacetal reacts with two molecular equivalents of sodiomalononitrile in ethanol solution at room temperature, there is obtained the disodium salt of 2-dicyanomethylene-1,1,3,3-tetracyanopropane (sodium 2-dicyanomethylene-1,1,3,3-tetracyanopropane-1,3-diide). An acetone solution of this salt is saturated with hydrogen chloride and there is obtained 2-amino-6-chloro-3,5-dicyano-4-dicyanomethylpyridine.

2-AMINO-6-CHLORO-3,5-DICYANO-4-HYDROXYPYRIDINE

When cyanoacetyl chloride condenses with malononitrile, there is obtained 1,1,3-tricyanoacetone which in its enolic form, 2-hydroxy-1,1,3-tricyano-1-propene, is reacted first with sodium methylate and then with cyanogen bromide to yield the sodium salt of α,γ-dicyano-β-hydroxy-glutaconodinitrile (sodium 2-hydroxy-1,1,3,3-tetracyanopropenide).

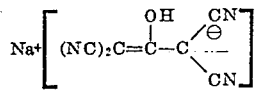

This compound is treated with anhydrous hydrogen chloride, and there is obtained 2-amino-6-chloro-3,5-dicyano-4-hydroxypyridine.

2-AMINO-6-CHLORO-3,5-DICYANO-4-PHENOXYPYRIDINE

The sodium salt of α,γ-dicyano-β-hydroxyglutaconodinitrile is carefully treated with small portions of phosphorus trichloride until a single equivalent of phosphorus trichloride has been added. There is obtained the sodium salt of β-chloro-α,γ-dicyanoglutaconodinitrile. This compound is treated with anhydrous hydrogen bromide to yield 2-amino-6-bromo-4-chloro-3,5-dicyanopyridine. Alternatively, by using phosphorus tribromide in place of phosphorus trichloride above, β-bromo-α,γ-dicyanoglutaconodinitrile is obtained. This compound is reacted with the sodium salt of phenol to yield the sodium salt of α,γ-dicyano-β-phenoxyglutaconodinitrile which, when treated with hydrogen chloride, yields 2-amino-6-chloro-3,5-dicyano-4-phenoxypyridine.

2 - AMINO - 6 - CHLORO - 3,5 - DICYANO - 4 - PHENYL - THIOPYRIDINE, ETC.

When the sodium salt of β-bromo-α,γ-dicyanoglutaconodinitrile is reacted with the sodium salt of thiophenol, the sodium salt of α,γ-dicyano-β-phenylthioglutaconodinitrile is obtained which, when treated with anhydrous hydrogen chloride, yields 2-amino-6-chloro-3,5-dicyano-4-phenylthiopyridine. By careful oxidation of the sodium salt of 2-phenylthio-1,1,3,3-tetracyanopropene (sodium salt of α,γ-dicyano-β-phenylthioglutaconodinitrile) with a single molecular equivalent of potassium permanganate or acidic hydrogen peroxide, there is obtained 2-phenylsulfinyl-1,1,3,3-tetracyanopropene, which when treated with anhydrous hydrogen chloride yields 2-amino-6-chloro-3,5-dicyano-4-phenylsulfinylpyridine. Further oxidation of 2-phenylsulfinyl-1,1,3,3-tetracyanopropene with permanganate yields 2-phenylsulfonyl-1,1,3,3-tetracyanopropene, which when treated with anhydrous hydrogen chloride yields 2-amino-6-chloro-3,5-dicyano-4-phenylsulfonylpyridine.

2-AMINO-6-CHLORO-3,5-DICYANO-4-ETHOXYPYRIDINE (1) The sodium salt of 2-ethoxy-1,1,3,3-tetracyanopropene is prepared as follows. Tetracyanoethylene is reacted with ethyl alcohol by dissolving 64 parts of tetracyanoethylene and 30 parts of urea (catalyst) in 395 parts of ethyl alcohol and heating the resulting solution at reflux until the initial deep purple color fades to a yellow. The solution is cooled and poured into 5000 parts of cold water. Dicyanoketene diethylacetal (60 parts) separates as an oil which solidifies on standing. It is purified by recrystallization from a mixture of alcohol and water.

(2) Dicyanoketene diethylacetal (554 parts) is added to a solution of sodiomalononitrile prepared by dissolving 77 parts of sodium in 3946 parts of absolute ethyl alcohol and adding 220 parts of malononitrile. As the solid dissolves, the solution becomes warm. The white precipitate which forms upon cooling is collected on a filter, washed with ether, and recrystallized from alcohol. There is obtained 450 parts of the sodium salt of 2-ethoxy-1,1,3,3-tetracyanopropene in the form of white needles which melt above 300° C.

(3) A solution of 104 parts of the sodium salt of 2-ethoxy-1,1,3,3-tetracyanopropene in 2376 parts of acetone is saturated with dry hydrogen chloride by passing in an excess of the gas over a 20-minute period. Sodium chloride (29 parts) precipitates and is separated by filtration. The filtrate is allowed to stand overnight, and 85 parts of 2-amino-6-chloro-3,5-dicyano-4-ethoxypyridine crystalizes out. This white crystalline solid starts to sublime at 175° C. and melts at 264–265° C.

6-CHLORO-2,4-DIAMINO-3,5-DICYANOPYRIDINE

The sodium salt of 2-ethoxy-1,1,3,3-tetracyanopropene is dissolved in concentrated aqueous ammonium hydroxide, and the mixture is boiled. There is obtained the sodium salt of 2-amino-1,1,3,3-tetracyanopropene which, when treated with hydrogen chloride in tetrahydrofuran solution, yields 6-chloro-2,4-diamino-3,5-dicyanopyridine.

2 - AMINO - 6 - CHLORO - 3,5 - DICYANO - 4 - METHYL AMINOPYRIDINE

When methylamine is used in place of ammonia in the reaction with 2-ethoxy-1,1,3,3-tetracyanopropene, 2-methylamino-1,1,3,3-tetracyanopropene is obtained which on treatment with hydrogen chloride yields 2-amino-6-chloro-3,5-dicyano-4-methylaminopyridine.

2 - AMINO - 6 - CHLORO - 3,5 - DICYANO - 4 - PIPERIDINO- PYRIDINE

By similar steps starting with piperidine, 2-piperidino-1,1,3,3-tetracyanopropene yields 2-amino-6-chloro-3,5-dicyano-4-piperidinopyridine.

2 - AMINO - 6 - CHLORO - 3,5 - DICYANO - 4 - PHENYL - PYRIDINE (1) Tricyanovinylbenzene is prepared by heating a solution of 14,900 parts of benzoyl cyanide, 500 parts of malononitrile, 66 parts of piperidine, and 236 parts of acetic acid in 4,400 parts of benzene at reflux temperature. The water formed is removed by azeotropic distillation through a continuous water separator. After 41 hours the solution is cooled, washed with water, and dried over anhydrous magnesium sulfate. Benzene is removed by distillation at atmospheric pressure, and excess benzoyl cyanide is removed by distillation at reduced pressure. The residue of 2,060 parts of tricyanovinylbenzene is recrystallized three times from cyclohexane to give yellow needles melting at 97–99.5° C.

(2) The sodium salt of 2-phenyl-1,1,3,3-tetracyanopropene is prepared by treating a suspension of sodiomalononitrile (prepared by adding 195 parts of malononitrile in 198 parts of ethanol to a solution of sodium ethoxide prepared from 68 parts of sodium and 946 parts of ethanol) with a solution containing 529 parts of tricyanovinylbenzene in 2370 parts of ethanol and 1500 parts of benzene. This addition is carried out at 0–5° C., and the mixture is stirred for one-half hour after addition is completed. Most of the solvent is removed at reduced pressure. Benzene is added to the remaining purple oil, and the solution is stored overnight at 5° C. The sodium salt of 2-phenyl-1,1,3,3-tetracyanopropene precipitates as a white crystalline solid which is separated by filtration, washed with benzene, and dried to yield 463 parts of product melting above 300° C.

(3) To a solution of 240 parts of the sodium salt of 2-phenyl-1,1,3,3-tetracyanopropene in 2000 parts of water is added a solution of 110 parts of tetramethylammonium chloride in 1000 parts of water. The resulting suspension is heated, and water is added until a clear solution is obtained. Upon cooling this solution, the tetramethylammonium salt of 2-phenyl-1,1,3,3-tetracyanopropene is precipitated as colorless needles which are recrystallized from water and dried exhaustively at 125–130° C. under reduced pressure to yield the anhydrous salt in the form of colorless needles melting at 141–142.5° C.

(4) A solution of 261 parts of the tetramethyl-ammonium salt of 2-phenyl-1,1,3,3-tetracyanopropene in 2070 parts of dioxane is heated to boiling and stirred. Hydrogen chloride gas is bubbled into the solution, and an exothermic reaction occurs. The external heat source is removed, and hydrogen chloride is passed through the solution to keep it saturated with hydrogen chloride for an additional 4½ hours. This solution is diluted with 714 parts of ether, cooled, and the white precipitate is filtered and washer, first with cold ether, then with water and dried to yield 201 parts (87.6%) of 2-amino-6-chloro-3,5-dicyano-4-phenylpyridine, melting at 300–309° C. (with previous softening). Recrystallization from chloroform gives purified product in the form of a white crystalline solid melting at 303–308° C. with previous sublimation.

2 - AMINO - 6 - CHLORO - 3,5 - DICYANO - 4 - (p - DI - METHYLAMINOPHENYL) PYRIDINE (1) N,N-Dimethyl-p-tricyanovinylaniline is prepared by heating a solution of 10 parts of tetracyanoethylene and 19.3 parts of N,N-dimethylaniline in 178 parts of tetrahydrofuran at reflux temperature for 5–10 minutes. Tetrahydrofuran is evaporated from the resulting deep blue solution, leaving 16 parts of N,N-dimethyl-p-tricyanovinylaniline in the form of a bright blue crystalline solid. It is purified by washing with ether and is recrystallized from ethyl alcohol.

(2) A suspension of sodiomalononitrile in ethyl alcohol is prepared in an atmosphere of nitrogen by adding 232 parts of malononitrile in 237 parts of ethanol to a solution of sodium ethoxide, prepared from 81 parts of sodium and 1580 parts of ethanol. An additional 395 parts of ethanol is added, and the suspension is cooled to 2° C. A solution of 782 parts of N,N-dimethyl-p-tricyanovinylaniline in 9770 parts of tetrahydrofuran is added slowly over a period of 25 minutes. The solution is stirred for an additional hour at 5° C. and then for two hours at room temperature. The solvent is removed by distillation at reduced pressure yielding 1159 parts of the sodium salt of 2-(p-dimethylaminophenyl)-1,1,3,3-tetracyanopropene in the form of brown solid melting above 300° C.

(3) A filtered solution of 283 parts of the sodium salt of 2-(p-dimethylaminophenyl)-1,1,3,3-tetracyanopropene in 5000 parts of water is stirred with a solution of 111 parts of tetramethylammonium chloride in 500 parts of water. The resulting solution is cooled, and the violet-colored precipitate which forms is separated by filtration, washed with cold water and dried to yield 193 parts (57.8%) of the crude tetramethylammonium salt of 2-(p - dimethylaminophenyl) - 1,1,3,3 - tetracyanopropene. After recrystallization from ethanol, this product is obtained in the form of violet-colored plates melting at 233–238° C. with decomposition.

(4) A suspension of 98 parts of the tetramethylammonium salt of 2-(p-dimethylaminophenyl)-1,1,3,3-tetracyanopropene in 5177 parts of dioxane in heated under reflux with stirring, while a stream of hydrogen chloride gas is bubbled through the solution. In a short time all of the starting material has dissolved, and a precipitate starts to form. After 2 hours the solution is cooled and diluted with 1070 parts of ether. The solid which precipitates is collected by filtration, washed with a cold 1:1 mixture of dioxane and ether, then washed with water and dried to give 75 parts (86%) of 2-amino-6-chloro-3,5-dicyano-4-(p-dimethylaminophenyl)pyridine. Recrystallization of this material from dimethylformamide gives a bright yellow solid melting above 320° C.

The 2,6-diamino-3,5-dicyanopyridines of this invention are useful as fluorescent pigments in fluorescent glow sheets, for illuminated dials, charts, and the like, since they become luminescent when exposed to ultraviolet light (UV). This property is illustrated in the following table which also shows the luminescence of these compounds when exposed to cathode rays, i. e., to a stream of electrons in an evacuated space.

Table II.—Luminescence produced by ultraviolet light and cathode rays

| Example | Compound | Luminescence | |
| --- | --- | --- | --- |
| | | UV (3650 A.) | Cathode Rays |
| I | 2,6-diamino-3, 4, 5-tricyanopyridine. | blue-white | blue-white. |
| II | 2 - amino - 6 - methylamino-3, 4, 5-tricyanopyridine. | yellow | yellow. |
| IV | 2 - amino - 6 - piperidino - 3, 4, 5-tricyanopyridine. | yellow | yellow. |
| V | 2 - amino - 6 - anilino-3, 4, 5-tricyanopyridine. | yellow | green. |
| VI | 2 - amino - 6 - p - chloroanilino-3, 4, 5-tricyanopyridine. | yellow | green-yellow. |
| X | 2,6 - diamino - 3, 5 - dicyanopyridine. | green-white | green-white. |

To use these compounds as fluorescent pigments, they may be embedded in powder form in a transparent thermoplastic sheet, portions of which are cut and in turn embedded in the face of a supporting thermoplastic base to produce a pattern which will be sharply visible when the surface of the composite is illuminated with ultraviolet light. Preparation of composite glow sheets of this type is shown in U. S. Patent 2,340,227, issued January 25, 1944, to A. R. Russell.

Since many different embodiments of the invention may be made without departing from the spirit and scope thereof, it is to be understood that the invention is not limited by the specific illustrations except to the extent defined in the following claims.

What is claimed is:

1. The new class of compounds, the 2,6-diamino-3,5-dicyanopyridines wherein the substituent in the 2-position is an unsubstituted amino group.

2. Compounds of the class defined in claim 1 in which the substituent in the 6-position is a primary amine group.

3. Compounds of the class defined in claim 1 in which the substituent in the 6-position is a secondary amine group.

4. Compounds of the class defined in claim 1 in which the substituent in the 6-position is a tertiary amine group.

5. Compounds of the class defined in claim 1 in which the substituent in the 6-position is a quaternary amine group.

6. Compounds of the class defined in claim 1 in which the substituent in the 6-position is a heterocyclic amine group.

7. The process for preparing compounds of the class defined in claim 1 which comprises reacting the 2-amino-3,5-dicyano-6-halogenopyridine analog with a reactant selected from the group consisting of ammonia and amines.

8. A process as defined in claim 7 in which the reaction is conducted in an inert solvent.

9. A process as defined in claim 7 in which said reactant is ammonia.

10. A process as defined in claim 7 in which said reactant is a primary amine.

11. A process as defined in claim 7 in which said reactant is a secondary amine.

12. A process as defined in claim 7 in which said reactant is a tertiary amine.

13. A process as defined in claim 7 in which said reactant is a heterocyclic amine.

References Cited in the file of this patent

Simons: Industrial and Engineering Chemistry, vol. 39, page 238 (1947).